United States Patent [19]

Matsubara et al.

[11] Patent Number: 5,149,170
[45] Date of Patent: Sep. 22, 1992

[54] VEHICLE ROOF WITH WATER CATCHING HEADLINER

[75] Inventors: Hirco Matsubara, Kamo, Japan; Kurt Meier, Oberdolling, Fed. Rep. of Germany; Georg Kohlpaintner, Martinsried, Fed. Rep. of Germany; Horst Bienert, Gauting, Fed. Rep. of Germany

[73] Assignee: Webasto AG Fahrzeugtechnik, Stockdorf, Fed. Rep. of Germany

[21] Appl. No.: 682,087

[22] Filed: Mar. 29, 1991

[51] Int. Cl.⁵ ............................................. B60J 7/053
[52] U.S. Cl. ................................. 296/213; 296/214; 296/222; 49/63
[58] Field of Search ............... 296/213, 214, 220, 222; 49/63, 65

[56] References Cited

U.S. PATENT DOCUMENTS

| | | | |
|---|---|---|---|
| 2,132,228 | 10/1938 | Bishop | 296/222 |
| 3,960,404 | 6/1976 | Bienert | 296/213 |
| 4,159,144 | 6/1979 | Ehlen et al. | 296/222 |
| 4,650,244 | 3/1987 | Boots | 296/223 |
| 4,844,532 | 7/1989 | Ono et al. | 296/213 |
| 4,844,534 | 7/1989 | Boots | 296/216 X |
| 4,978,165 | 12/1990 | Schreiter et al. | 296/214 X |

FOREIGN PATENT DOCUMENTS 0368404  5/1990  European Pat. Off. .
0282121  12/1986  Japan ................................. 296/214
2201382  9/1988  United Kingdom .

Primary Examiner—Dennis H. Pedder
Attorney, Agent, or Firm—Sixbey, Friedman, Leedom & Ferguson

[57] ABSTRACT

Vehicle roof with a cover for, alternatively closing and at least partially opening a roof opening, with a sliding inside roof headliner for, alternatively, closing and at least partially opening a framed opening lying under the roof opening, with a respective drip molding running in the longitudinal vehicle direction under each side of the roof opening, with longitudinal guide mechanisms, along which the cover is displaced by a drive device in the longitudinal direction of the vehicle, extending along the drip moldings; and wherein, according to preferred embodiments of the invention, a water catching device that is located under the rear edge of the roof opening, at least when the cover is in its forwardmost position, and that catches water coming in there and diverts it into the lateral drip moldings, is formed by the sliding inside roof headliner, itself. More specifically, water is collected upon the top surface of the sliding roof headliner and is directed laterally off of its side edges into the drip moldings either directly (by the side edges hanging over the drip moldings) or indirectly (by water ducts that connect to the drip moldings via laterally extending passages).

22 Claims, 4 Drawing Sheets

VEHICLE ROOF WITH WATER CATCHING HEADLINER

BACKGROUND OF THE INVENTION

The invention relates to a vehicle roof with a cover for alternatively closing or at least partially opening a roof opening, with a sliding inside roof headliner for alternatively closing or at least partially opening a framed opening lying under the roof opening, with drip moldings running in the lengthwise vehicle direction under both sides of the roof opening, with longitudinally extending cover guide mechanisms extending along the drip moldings and along which the cover is guided to be displaced by an adjustment device in the longitudinal vehicle direction, and with a water catching device that is located under the rear edge of the roof opening, at least when the cover is in its forwardmost position, and that, optionally catches water coming in there and diverts it into the lateral drip moldings.

In a known vehicle roof of this type (U.S. Pat. Nos. 4,332,416 and 4,320,921), a gutter is provided as a water catching device that is connected by rods to the cover to accompany the cover in its sliding movements. The gutter is located above the sliding inside roof headliner, which can be slid independently of the cover. In the closed cover position, the drip molding engages under the edge gap between the rear edge of the cover and the rear edge of the roof opening. If the cover is pushed rearward, the drip molding also moves rearward.

SUMMARY OF THE INVENTION

The invention has a primary object of providing a vehicle roof of the above-mentioned type that makes do with a smaller number of individual parts and makes it possible to reduce the overall structural height of the roof.

This object is achieved in a surprisingly simple way, starting from a vehicle roof of the above-mentioned type, in that the sliding inside roof headliner, itself, forms the water catching device.

Therefore, additional components for the separate gutter and for the attachment of such a gutter to the cover are eliminated. Assembly is accordingly simplified. Because a gutter is not present, vertically, between the cover or the stationary roof surface and the sliding inside roof headliner, the roof can be made flatter.

Preferably, the sliding inside roof headliner can be slid independently of the cover, as is usual for vehicle roofs in which the cover is transparent (e.g., a glass cover is used). The sliding inside roof headliner, suitably, has raised end plates, at least in the area of its front and its rear edge, to preclude the water which is caught from spilling over into the vehicle interior. The lateral edges of the sliding inside roof headliner can extend partially over the drip moldings in a crosswise direction, and they can be slanted downward so that the water caught is diverted by the lateral outer edges of the sliding inside roof headliner into the drip molding. According to a modified configuration, the sliding inside roof headliner can have raised side plates, also, along most of the length of its side edges, and then, the sliding inside roof headliner is provided with lateral water drains that extend, from the lateral side plates, outward to an area above the drip moldings. In this case, water collected upon the headliner is diverted by the water drains into the drip molding.

Preferably, the longitudinal cover guide mechanisms, which can be made in particular as guide tracks, each are placed on a side wall, lying outside of the associated drip molding in the crosswise direction, at a distance above the respective drip molding. In this way, the longitudinal cover guide mechanisms not only are raised out of the area in which the water is being conveyed, but it also becomes possible to keep the framed opening especially wide to guarantee a large opening area.

The sliding inside roof headliner, advantageously, can be guided to slide on each side of the roof along a longitudinal guide mechanism that, itself, forms an inner side wall of the drip molding.

According to a modified configuration, the longitudinal guide mechanisms for the cover and/or for the sliding inside roof headliner forms an inner side wall of the associated drip molding, the sliding inside roof headliner diverting water that is caught into a water duct that extends along the inner side of the respective lengthwise guide mechanism. This water duct is connected to the associated drip molding by at least one passageway that extends crosswise through the longitudinal guide mechanism. In this case, water caught by the sliding inside roof headliner passes, first, into the water duct and such water, then, goes into the drip molding through the at least one passageway.

While we have shown and described various embodiments in accordance with the present invention, it is understood that the same is not limited thereto, but is susceptible of numerous changes and modifications as known to those skilled in the art, and we, therefore, do not wish to be limited to the details shown and described herein, but intend to cover all such changes and modifications as are encompassed by the scope of the appended claims.

DETAILED DESCRIPTION OF THE PREFERRED EMBODIMENTS

Figure 2:
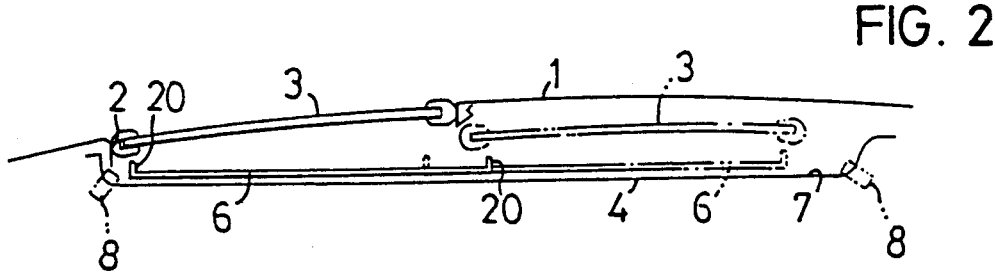
FIG. 2 is a diagrammatic, longitudinal section through the vehicle roof according to FIG. 1.

As can be seen, especially from FIG. 2, a rectangular roof opening 2 is formed in a front area of a stationary roof skin 1 of a vehicle. The rectangular roof opening 2 can be, alternatively, closed or at least partially opened by a transparent cover (glass cover) 3. The closed position is drawn in solid lines and the fully open position in dot-dash lines in FIG. 2. A frame 4 is fixed under the roof skin 1 and in which a framed opening 5 is made. Framed opening 5 lies under roof opening 2, and it can be, alternatively, closed or at least partially opened by a sliding inside roof headliner 6. Its closed and fully open positions are also represented in solid and in dot-dash lines, respectively in FIG. 2. At least some of the sliding movements of sliding inside roof headliner 6 can be performed independently of the movements of cover 3, as is known from U.S. Pat. No. 4,320,921 among others.

Figure 1:
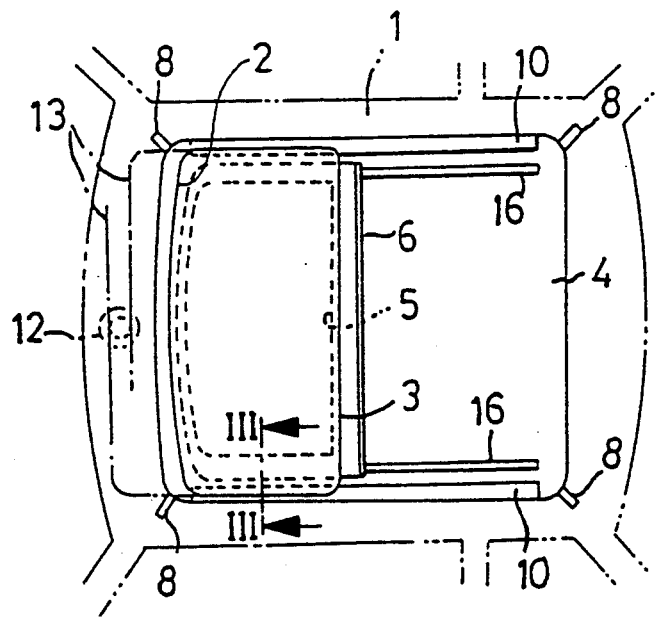
FIG. 1 is a top view of a vehicle roof according to the invention.

Frame 4 forms drip moldings 7 that run in the longitudinal vehicle direction (i.e., between the front and rear) under both sides of the roof opening 2. The moldings 7 catch water (rain, wash water and the like) that enters between the side edges of roof which define opening 2 and the side edges of cover 3. Such water is diverted out of drip moldings 7 by drain tubes 8, which are at the corners of frame 4 (FIGS. 1 and 2), as is known.

Figure 3:
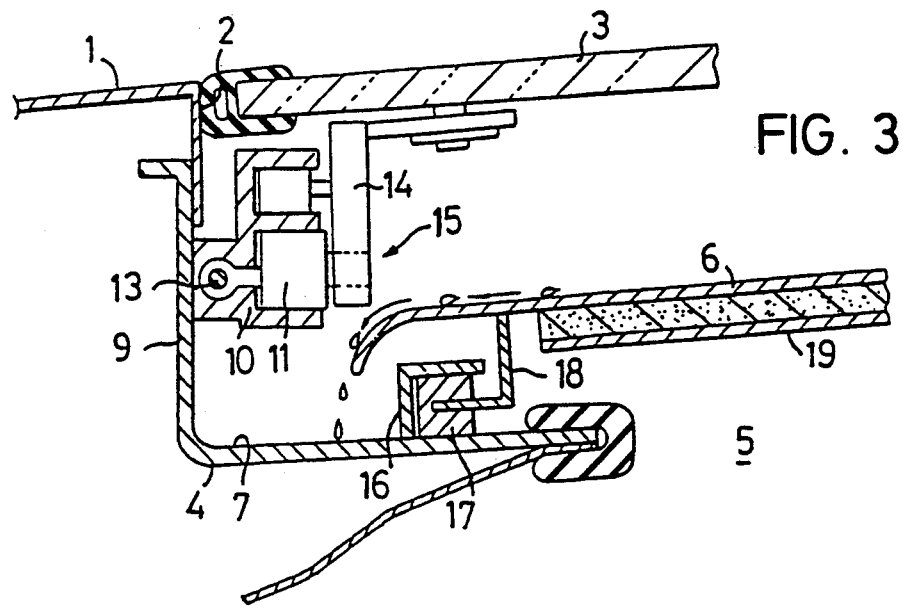
FIG. 3 is an enlarged partial cross-section taken along line III—III of FIG. 1.

In the configuration shown in detail in FIG. 3, drip moldings 7 are laterally bordered on the outside by a side wall 9 of frame 4 that lies essentially flush with the respective side edge of roof opening 2. Here, it is to be kept in mind that the arrangement is made in mirror-image symmetry relative to a longitudinal center axis of the roof, so that an explanation of the design on the one side applies correspondingly, also, to the configuration on the other side. A guide track 10 extends in the vehicle longitudinal direction at a distance above the bottom of the drip molding, being attached to the inner side of outer side wall 9 of frame 4 above the portion forming drip molding 7. The sliding parts carrying cover 3 are guided to slide along the guide track 10. FIG. 3 shows a left rear sliding part 11 that is connected for drive purposes to a drive 12 by a incompressible drive cable 13. Sliding part 11 is connected to cover 3 by a raising lever 14. As a function of a sliding movement of the sliding part 11, raising lever 14 is caused to make pivoting movements, in a way known in the art, to raise the cover into the closed position or to lower the cover rear edge to enable the cover to slide rearward (FIG. 2). The adjustment mechanism for displacing the cover and of which sliding part 11 and raising lever 14, along with other parts, are components, is designated, as a whole, by 15 in FIG. 3. Adjustment mechanism 15 can be made in a conventionally known way.

Sliding inside roof headliner 6 is a plate-shaped component made of a light metal with high corrosion resistance, for example, aluminum or an aluminum alloy, or of a suitable plastic. An inner covering 19 is attached on the underside of sliding inside roof headliner 6 in the embodiment illustrated in FIG. 3. Sliding inside roof headliner 6 is supported on sliding blocks 17 by a sliding block carrier 18. Sliding blocks 17, of which only one is shown in FIG. 3, are guided to slide along guide tracks 16 in the vehicle longitudinal direction. Each guide track 16 is inwardly offset in the crosswise direction with respect to outer side wall 9 and forms the longitudinally extending inner side wall of drip molding 7

In the fully closed position of sliding inside roof headliner 6, its rear edge lies rearwardly and below the rear edge of roof opening 2, while in the fully opened (i.e., slid-back) position of sliding inside roof headliner 6, its front edge lies further forward, in the vehicle longitudinal direction than the rear edge of roof opening 2, as is represented in FIG. 2 with unbroken and dot-dash lines, respectively. Sliding inside roof headliner 6, consequently, can catch water that penetrates the area between the rear edge of roof defining opening 2 and the rear edge of cover 3 in any of its possible sliding positions.

Starting from its center line in the crosswise direction, the sliding inside roof headliner 6 is slanted slightly downward toward each lateral side, and its lateral outer edges hang over a part of the crosswise dimension of the drip moldings 7 as can be seen in FIG. 3. Water caught by sliding inside roof headliner 6 is, thus, diverted to the lateral outer edges of the sliding inside roof headliner, where it runs into the drip moldings 7 lying below them. As can be seen especially in FIG. 2, sliding inside roof headliner 6 has a raised end plate, in the area of each of its front and rear edges, so that water standing on sliding inside roof headliner 6 cannot run or spill over forwardly or rearwardly in the longitudinal direction.

The arrangement described above is also suitable for vehicle roofs in which the sliding inside roof headliner is coupled to the cover, so that it accompanies the cover in all sliding movements, as is the case, especially, for sheet metal covers.

Because the guide track is on the outer side wall 9 of frame 4 above the drip molding 7, the distance between outer side wall of the drip moldings and the edge of the framed opening 5 can be kept relatively small. This leads to a comparatively wide framed opening 5 and, thus, to a comparatively large area of visibility. Because the additional gutter which had been provided, up to now, is eliminated from the space between the cover or the fixed roof skin and the sliding inside roof headliner, the structural height of the roof (between the underside of cover 3 and roof skin 1, and the top surface of the bottom wall of the frame which contains opening 5) can be kept especially low, which leads to increased headroom.

Figure 4:
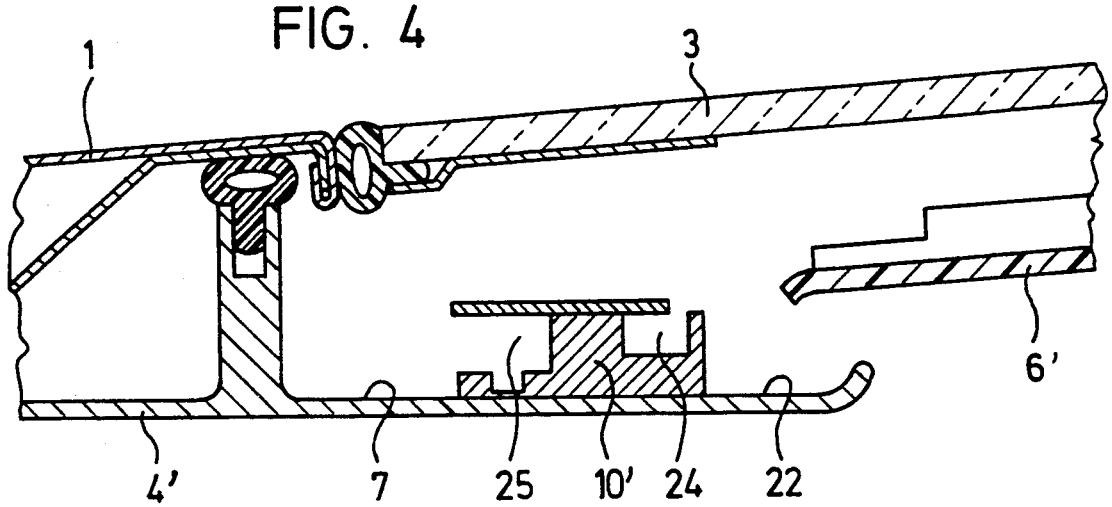
FIG. 4 is a cross-sectional view, corresponding to FIG. 3, of a modified embodiment.
Figure 5:
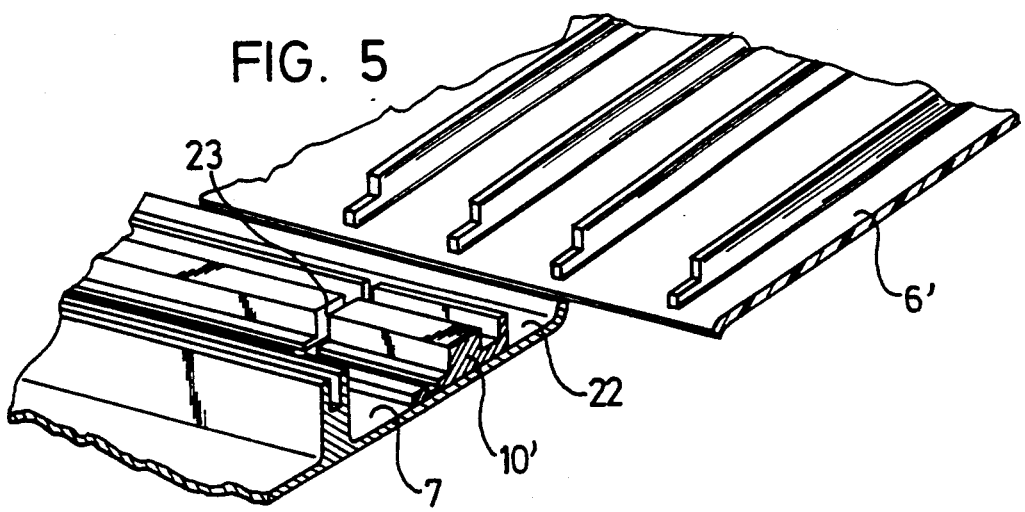
FIG. 5 is a partial perspective view of the FIG. 4 embodiment.

In the modified embodiment illustrated in FIGS. 4 and 5, guide tracks 10' for cover 3 form the inner side wall of drip molding 7, i.e., is on the side of the respective associated drip molding 7 which is closest, in a crosswise direction, to the center of the roof. A water duct 22 of frame 4' extends longitudinally along the inner side of each of guide tracks 10'. Sliding inside roof headliner 6' extends in the crosswise direction, so that each of its side edges hang partway over a respective water duct 22 to enable water caught by sliding inside roof headliner 6' to run into the water duct 22 lying below it. A passageway 23 connects water duct 22 with drip molding 7 and passes through the guide track 10'. Water directed into water duct 22, thus, goes through passageway 23 into drip molding 7, and from there it is carried away by drain tubes 8, as explained with respect to FIGS. 1 to 3. Sliding inside roof headliner 6' can be supported, in a known way not illustrated in more detail, by sliding blocks, corresponding to sliding blocks 17 of FIG. 3. The slide blocks for headliner 6' run in a guide channel 24 of guide track 10', while the sliding blocks connected to cover 3 run in another guide channel 25 of guide track 10'.

Figure 6:
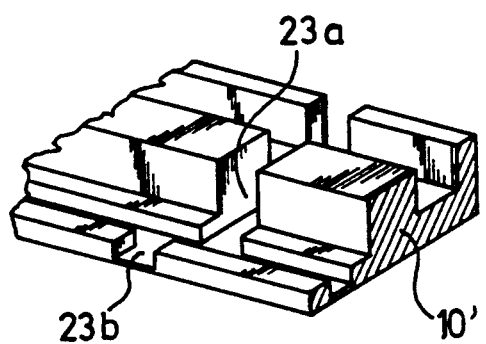
FIG. 6 is a partial perspective view of a modified configuration of a passageway going crosswise through a longitudinal lengthwise guide mechanism.
Figure 7:
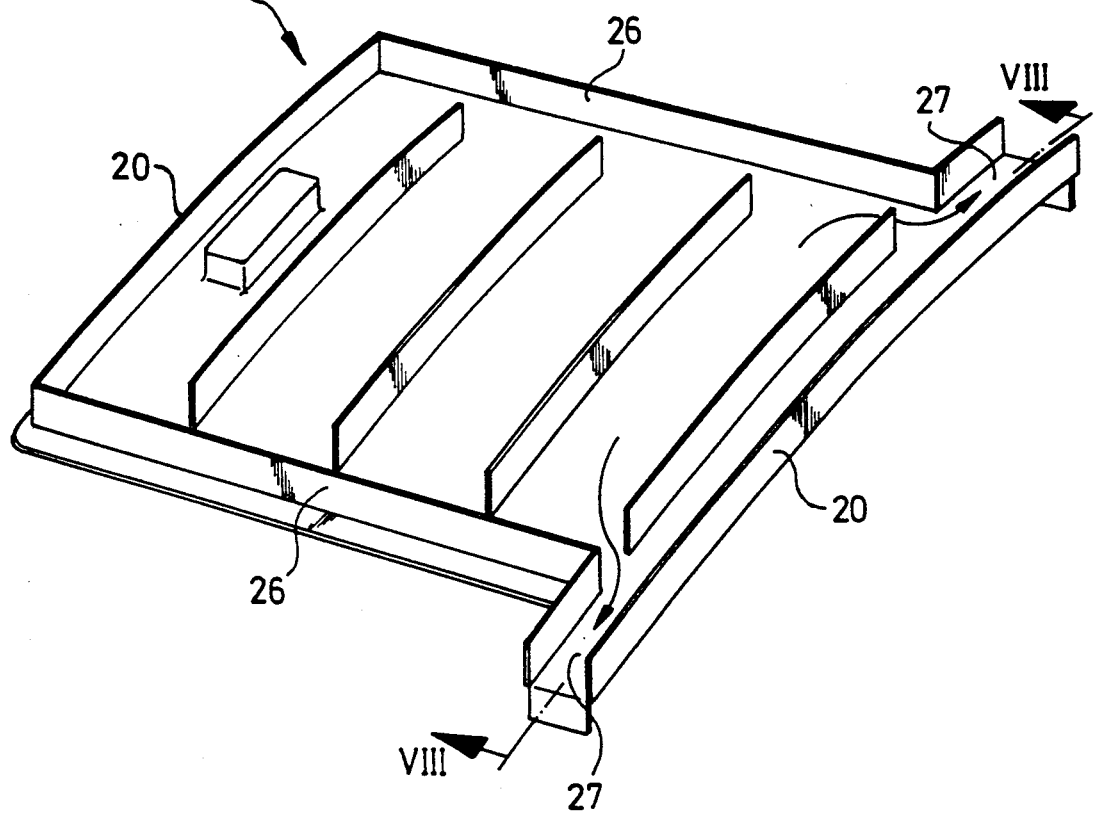
FIG. 7 is a perspective top view of a sliding inside roof headliner in accordance with a further embodiment of the invention.
Figure 8:
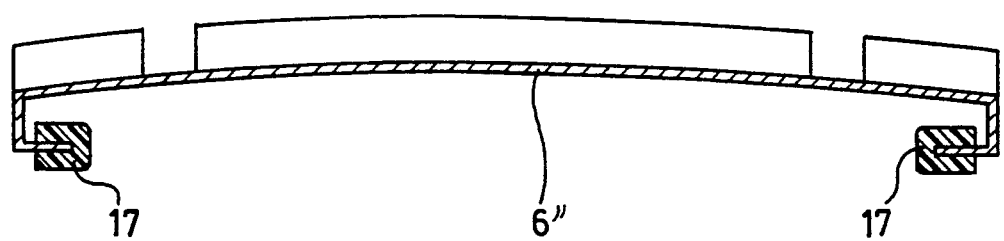
FIG. 8 is a cross-sectional view of the sliding inside roof headliner according to FIG. 7 taken along line VIII—VIII of FIG. 7.
Figure 9:
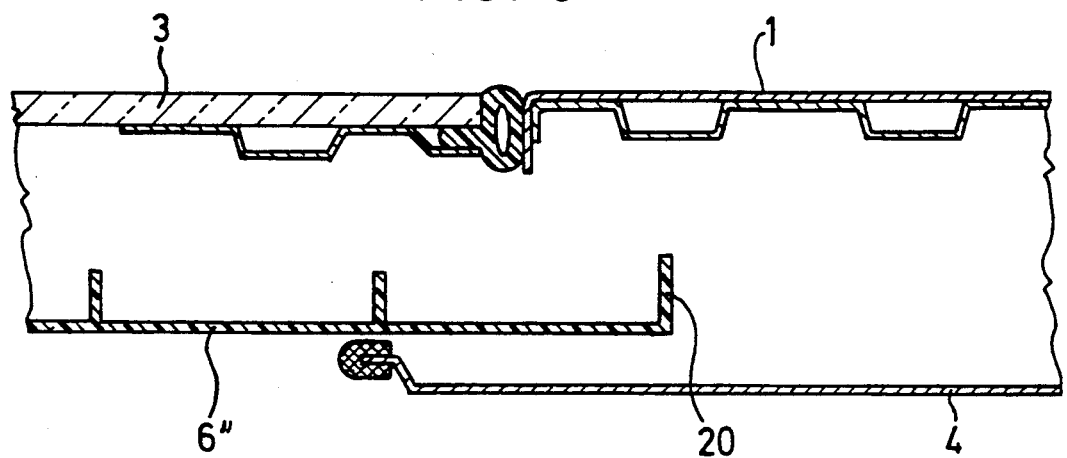
FIGS. 9 and 10 are enlarged, partial longitudinal sections through a vehicle roof with a sliding inside roof headliner according to FIGS. 7 and 8, with the cover and sliding inside roof headliner illustrated in closed and partially open positions, respectively.
Figure 10:
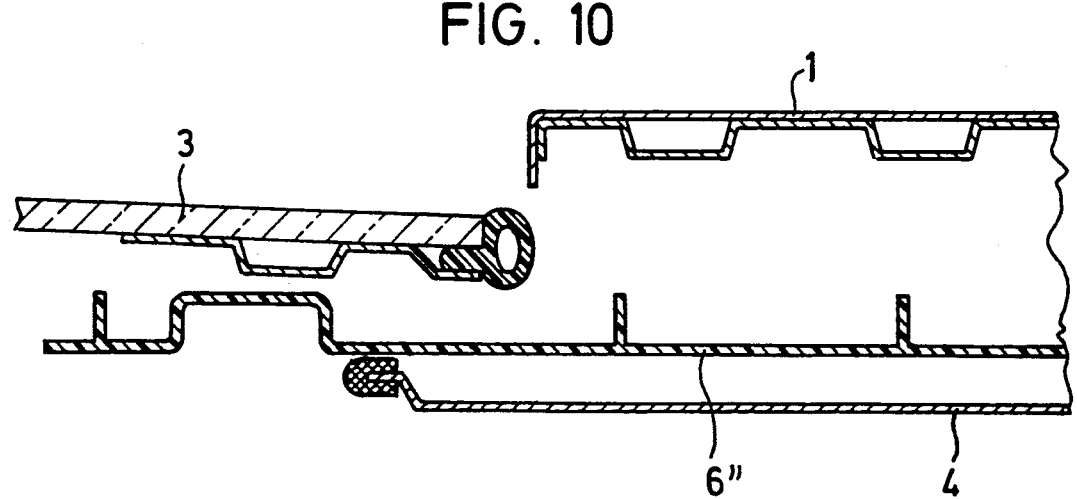

As shown in FIG. 6, parts 23a and 23b of passageway 23 can be longitudinally offset relative to one another along the of guide track 10'. In this way, a smooth and even operation of the sliding parts supporting cover 3 is assured.

A further modified sliding inside roof headliner 6" is illustrated in FIGS. 7 to 10. In addition to front and rear end plates 20, raised side plates 26 extend along most of the length of its side edges. Near the rear end of sliding inside roof headliner 6", water drains 27 are provided which project outwardly from the side plates 26 to an extent that a drip molding 7 lies under the outlet of each of the water drains. In the fully closed state (FIG. 9) and in the fully open (slid-back) state (FIG. 10), and in all intermediate positions of the headliner 6", the headliner lies under the edge gap between the rear edge of cover 3 and the rear edge of roof opening 2. Sliding inside roof headliner 6" is guided to slide by sliding blocks 17 along guide tracks on the frame 4 as indicated for the other embodiments.

These and further objects, features and advantages of the present invention will become more obvious from the following description when taken in connection with the accompanying drawings which show, for purposes of illustration only, several embodiments in accordance with the present invention.

We claim:

1. Vehicle roof with a roof opening in a stationary roof skin and a cover for alternatively closing and at least partially opening the roof opening, as well a with a rigid sliding inside roof headliner for alternatively closing and at least partially opening a framed opening lying under the roof opening, said headliner comprising a headliner panel having an upper side extending from rearwardly of the roof opening to a front edge area of the roof opening in a forwardmost position thereof, and with a lateral drip molding running, in a longitudinal vehicle direction, under each lateral side of the roof opening, longitudinal cover guide mechanisms extending along the drip moldings and guiding the cover during displacement thereof by a drive mechanism in the longitudinal vehicle direction; wherein the sliding inside roof headliner, itself, forms a water catching device that is located under an edge gap defined between a rear edge of the cover and an adjoining rear edge of an upper roof surface in the plane of the stationary roof skin at the roof opening, at least when the cover is in said forwardmost position, said headliner being configured as a means for directly catching any water coming through the edge gap of the roof opening at its rear edge and for diverting the water over said upper side of the headliner panel into the lateral drip moldings at side edge areas of the headliner without spilling off a rear edge of the headliner panel.

2. Vehicle roof according to claim 1, wherein the sliding inside roof headliner is slidable independently of the cover.

3. Vehicle roof according to claim 2, wherein sliding inside roof headliner has raised end plates at an area of front and rear edges thereof.

4. Vehicle roof according to claim 3, wherein each of lateral outer edges of the sliding inside roof headliner hang over a respective drip molding and extend partway across a crosswise dimension of the drip molding, a top surface of the roof headliner slanting downward in a laterally outward direction, so that water caught on the top surface of the sliding inside roof headliner is directed by the lateral outer edges of the sliding inside roof headliner into the drip moldings.

5. Vehicle roof according to claim 3, wherein the sliding inside roof headliner has lateral side edges with raised lateral side plates extending along most of their length; and wherein the sliding inside roof headliner is provided with at least one lateral water drain that extends outward from each of the lateral side plates to above the drip moldings.

6. Vehicle roof according to claim 1, wherein each of the longitudinal cover guide mechanisms is placed on a side wall which is located on a laterally outer side of a respective drip molding in a crosswise direction.

7. Vehicle roof according to claim 6, wherein the longitudinal guide mechanisms are located a distance above the respective drip molding.

8. Vehicle roof according to claim 1, wherein each side of the sliding inside roof headliner is guided to slide along a respective longitudinal headliner guide mechanism; and wherein the respective longitudinal headliner guide mechanism forms an inner side wall of a respective drip molding.

9. Vehicle roof with a roof opening in a stationary roof skin and a cover for alternatively closing and at least partially opening the roof opening, as well as with a sliding inside roof headliner for alternatively closing and at least partially opening a framed opening lying under the roof opening, and with a lateral drip molding running, in a longitudinal vehicle direction, under each lateral side of the roof opening, longitudinal cover guide mechanisms extending along the drip moldings and guiding the cover during displacement thereof by a drive mechanism in the longitudinal vehicle direction; wherein the sliding inside roof headliner, itself, forms a water catching device that is located under a rear edge of the roof opening, at least when the cover is in a forwardmost position, said headliner being configured as a means for directly catching any water coming through the roof opening at its rear edge and for diverting the water over an upper side of the headliner into the lateral drip moldings at side edge areas of the headliner; wherein each of the longitudinal cover guide mechanisms form an inner side wall of a respective drip molding and an outer wall of a longitudinally extending water duct; wherein the water duct is connected to a respective drip molding by at least one laterally extending passageway through the respective longitudinal cover guide mechanism and wherein the sliding inside roof headliner is constructed so as to divert water caught on its upper surface into the water duct, from which it is able to flow into the drip molding via the laterally extending passageway.

10. Vehicle roof according to claim 2, wherein each of the longitudinal cover guide mechanisms is placed on a side wall which is located on a laterally outer side of a respective drip molding in a crosswise direction.

11. Vehicle roof according to claim 10, wherein the longitudinal guide mechanisms are located a distance above the respective drip molding.

12. Vehicle roof according to claim 2, wherein each side of the sliding inside roof headliner is guided to slide along a respective longitudinal headliner guide mechanism; and wherein the respective longitudinal headliner guide mechanism forms an inner side wall of a respective drip molding.

13. Vehicle roof according to claim 2, wherein each of the longitudinal cover guide mechanisms form an inner side wall of a respective drip molding and an outer wall of a longitudinally extending water duct; wherein the water duct is connected to a respective drip molding by at least one laterally extending passageway through the respective longitudinal cover guide mechanism and wherein the sliding inside roof headliner is constructed so as to divert water caught on its upper surface into the water duct, from which it is able to flow into the drip molding via the laterally extending passageway.

14. Vehicle roof according to claim 1, wherein said sliding inside roof headliner has raised end plates at an area of front and rear edges thereof.

15. Vehicle roof according to claim 14, wherein each of lateral outer edges of the sliding inside roof headliner hang over a respective drip molding and extend partway across a crosswise dimension of the drip moldings, a top surface of the roof headliner slanting downward in a laterally outward direction, so that water caught on the top surface of the sliding inside roof headliner is directed by the lateral outer edges of the sliding inside roof headliner into the drip moldings.

16. Vehicle roof with a roof opening in a stationary roof skin and a cover for alternatively closing and at least partially opening the roof opening, as well as with a sliding inside roof headliner for alternatively closing and at least partially opening a framed opening lying under the roof opening, and with a lateral drip molding running, in a longitudinal vehicle direction, under each lateral side of the roof opening, longitudinal cover guide mechanisms extending along the drip moldings and guiding the cover during displacement thereof by a drive mechanism in the longitudinal vehicle direction; wherein the sliding inside roof headliner, itself, forms a water catching device that is located under a rear edge of the roof opening, at least when the cover is in a forwardmost position, said headliner being configured as a means for directly catching any water coming through the roof opening at its rear edge and for diverting the water over an upper side of the headliner into the lateral drip moldings at side edge areas of the headliner; wherein said sliding inside roof headliner has raised end plates at an area of front and rear edges thereof; wherein the sliding inside roof headliner has lateral side edges with raised lateral side plates extending along most of their length; and wherein the sliding inside roof headliner is provided with at least one lateral water drain that extends outward from each of the lateral side plates to above the drip moldings.

17. Vehicle roof according to claim 16, wherein each side of the sliding inside roof headliner is guided to slide along a respective longitudinal headliner guide mechanism; and wherein the respective longitudinal headliner guide mechanism forms an inner side wall of a respective drip molding.

18. Vehicle roof according to claim 1, wherein each of the longitudinal cover guide mechanisms is placed on a side wall of a frame bordering the roof opening and which is located on a laterally outer side of a respective drip molding in a crosswise direction.

19. Vehicle roof according to claim 18, wherein the longitudinal cover guide mechanisms are located a distance above the respective drip molding.

20. Vehicle roof according to claim 19, wherein each of lateral outer edges of the sliding inside roof headliner hang over a respective drip molding and extend partway across a crosswise dimension of the drip molding, a top surface of the roof headliner slanting downward in a laterally outward direction, so that water caught on the top surface of the sliding inside roof headliner is directed by the lateral outer edges of the sliding inside roof headliner into the drip moldings.

21. Vehicle roof according to claim 9, wherein the laterally extending passageway is formed of parts which are longitudinally offset relative to one another along opposite sides of a guide track of the longitudinal cover guide mechanism.

22. Vehicle roof according to claim 1, wherein the side edge areas of the headliner have a downturned lip for guiding water down into the lateral drip moldings.

* * * * *